Aug. 1, 1933. H. F. DE SAUGY 1,920,682
METHOD AND DEVICE FOR COOLING GASES BY CONTACT WITH A LIQUID
Filed June 5, 1931
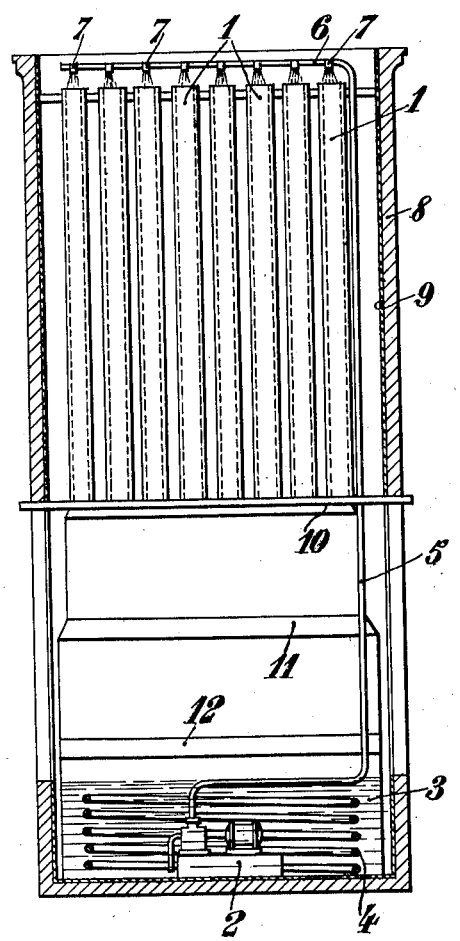
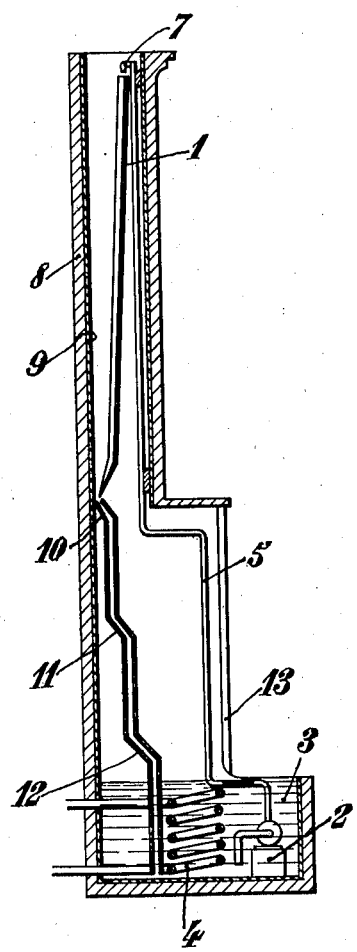
H. Frossard de Saugy
INVENTOR
By: Marks & Clerk Attys.

Patented Aug. 1, 1933

1,920,682

UNITED STATES PATENT OFFICE 1,920,682

METHOD AND DEVICE FOR COOLING GASES BY CONTACT WITH A LIQUID

Humbert Frossard de Saugy, Paris, France

Application June 5, 1931, Serial No. 542,402, and in France June 16, 1930

3 Claims. (Cl. 261—11)

Numerous types of heat exchangers exist, having for object to put a gas to be cooled in contact, during a greater or less period of time, with a cooling liquid, either directly, or through the medium of a fan or the like.

The most currently used method consists in causing a cooling liquid to trickle down suitable surfaces, constituted either by cloths, or by plates vertically arranged on inclined, pipings or the like, and in directing, by means of a fan for instance, the gas to be cooled on to these liquid sheets or moist surfaces.

By this method, the speed of circulation of the gas to be cooled is, in general, very different from the speed of the cooling liquid, without the operator taking into consideration the directions followed by the liquid and by the gas. It results therefrom that the known means have for effect to reduce the period of contact of the gas to be cooled with a given portion of liquid, the cooling operation taking place even on the counter-current principle. All these means have for object to promote evaporation of a certain quantity of cooling liquid.

After various experiments, the applicant has made the following discoveries concerning the cooling of air by contact with water.

If non saturated air comes in contact with a water sheet, a saturation of the air results therefrom, even if the temperature of the water is lower than that of the air.

This saturation is so much more rapid as the speed of the air is greater relatively to that of water. The speed of saturation decreases with the temperature of the air.

The speed of saturation is reversely proportional to the degree of saturation of the air.

The applicant has naturally been led to conclude from the above discoveries that if the air has no speed relatively to the sheet of water, a simple thermal exchange only takes place by contact between both fluids present. The air will yield a portion of the water vapour it contains only if, owing to a lowering of its temperature, its saturation reaches 100%.

Consequently, if in a heat exchanger, the air has a speed very different from that of the cooling water, the air will begin to saturate by contact with water, which is precisely in opposition to the desired result, this assuring whether the speed of the air is very high (a speed of the air of 7 meters per second is usually admitted in air coolers), or whether the speed of the air is added to that of the cooling water (because the displacements of air and water take place in different directions).

This saturation can be further accelerated owing to the lowering of temperature resulting from a partial evaporation of the water placed in contact with the air. It will thus result that the increase of water content of the air will be so much smaller as the difference of temperature between water and air will be greater. Usually this difference of temperature is only of two or three degrees, as for economical reasons, it is advantageous to operate at temperatures of cooling water as high as possible. The cost price of the cooling is higher when as the heat is absorbed at lower temperatures.

The method forming the subject-matter of the present invention is characterized in that the speed of discharge of the cooling liquid is used for carrying along, mainly by a viscosity effect, the gas to be cooled, so that both fluids present move substantially without relative movement. The invention for carrying out the method above set forth, has the following characteristics:

(a) The surfaces on which flows the cooling liquid are preferably constituted by irons having any cross section and vertically arranged or inclined, these surfaces being either directly placed in the chamber or enclosure the atmosphere of which is to be cooled (gas, vapour, air), or arranged in a suitable casing in communication with the said enclosure by means of simple inlet and outlet openings or conduits.

(b) The speed of discharge of the cooling liquid is reduced at the end of the movement in the enclosure in which the thermal exchange is effected by interposition of a suitable surface in the path followed by the liquid, so as to facilitate the condensation of the vapours held in suspension in the above mentioned enclosure.

(c) A fixed or movable resistance or speed reducing device is provided at a suitable point of the surface on which flows the liquid and preferably between the upper part, more particularly used for cooling the fluid, and the lower part more particularly adapted according to (b) to condensate the vapours in suspension in this enclosure.

A form of carrying out the invention is illustrated, by way of example only, in the accompanying drawing in which:

Fig. 1 is an elevation of the heat exchanger partly in section.

Fig. 2 is a vertical section of Fig. 1.

This heat exchanger has, on the one hand, mea... supplying cooling liquid to the upper part of the surfaces on which this liquid flows, and, on the other hand, means allowing, as indicated, to reduce the speed of discharge of this liquid, and finally a device ensuring the suction of the fluid to be cooled: gas, vapour and more particularly the atmosphere of living premises or other chambers or enclosures, as well as the evacuation of this fluid after cooling.

The radiation surfaces are constituted by channel irons 1 having for instance a U-shaped cross-section, which are particularly suitable for conveying the fluid to be cooled. The cross-section of these irons can however be different from that shown and, among others, it can have a T, double T, cruciform, semicircular or like shape. These irons are inclined and receive at their upper end the cooling liquid, which is first sucked, by a motor-pump unit 2 or the like, from a vat 3 in which is provided a cooling coil 4, and subsequently delivered, through the piping 5, above the radiation surfaces or channels where this piping forms a header 6. The latter has liquid outlet orifices 7 opposite each of the radiation surfaces which are arranged in a sheath 8 having a metal coating 9.

In case the fluid to be cooled is the air of a hall for instance, or of any other enclosure, this air rises to the upper part of the hall or enclosure in proportion to its increase of temperature, and thus comes above the sheath 8 in which it is carried along by trickling of the cooling liquid on the radiation surfaces. The air to be cooled can be directed towards the upper part of the said surfaces by a fan or the like.

The carrying along and cooling of the fluid depend on the speed of discharge of the liquid, on the length of the distance covered by the latter, on the shape and arrangement adopted for the trickling surfaces, and finally on the temperature and nature of the liquid. During this first phase of the operation, a simple lowering of the temperature of the fluid takes place.

From a certain height, the discharge velocity of the liquid is suddenly reduced, either by utilizing a different radiator surface, offering a greater resistance, or by modifying the direction of discharge of the liquid, or again by inserting a fixed or movable resistance on the totality or a portion only of the liquid sheet. This reduction of speed has for effect to diminish at the same time the speed with which the fluid is carried along and to facilitate the condensation of a portion of the vapours contained in the cooled surrounding medium. This condensation has for effect to complete the cooling of the surrounding medium and to dry it; it causes a further quantity of fluid to be carried along and facilitates the evolution of the cooled fluid at the lower part of the circuit.

In the form of construction illustrated, the reduction of speed of the cooling liquid is obtained for instance by arranging below the radiation surfaces of the channels 1, a wall or partition having inclined portions 10, 11 and 12 alternating with vertical portions, and on which the liquid falls as a cascade when issuing from the channel irons. This liquid finally flows in the vat 3 where it is cooled, as previously indicated, by the coil 4, ready for a new circuit, whilst the air cooled by contact with the liquid is evacuated through openings in the casing provided at 13.

The heat exchanger previously set forth can receive multiple applications, particularly in all cases in which it is required to maintain the temperature of an enclosure within definite limits.

What I claim as my invention and desire to secure by Letters Patent is:

1. A method of cooling the air of enclosures by contact with a liquid, consisting in conducting said liquid through an enclosure in substantially vertical, downward direction along cooling surfaces about half way down inside the enclosure and thereupon causing the liquid to trickle "cascade-wise" in a thin stream in the lower half of the enclosure along condensing surfaces in order to carry along the surrounding air by adherence and without relative velocity between the air and the liquid thereby obtaining an exchange of calories between said two fluids without any substantial evaporation of the liquid.

2. In an apparatus for cooling the air of enclosures by contact with a liquid, metal channels open at the upper and lower ends with free communication between them and disposed parallelly and substantially vertically in the upper half of said enclosure, a reservoir for cooling liquid in the bottom of the enclosure, means for leading a cooling liquid from the reservoir to the upper end of the metal channels and for regulating the discharge into the channels so that it descends in thin sheets along the surfaces of said channels, and speed reducing means below the channels in the enclosure for reducing the speed of the descending liquid and promoting condensation.

3. In an apparatus according to claim 2, said speed reducing means comprising partitions adapted to cause trickling of liquid forming continuation of the metal channels and having alternating vertical and inclined portions in order to produce cascading of the descending liquid and thereby reducing the speed of the liquid and promoting the drying of the surrounding air by condensation of vapor, the effects of contraction of the air due to the condensation accelerating the circulation of the latter in the lower part of the enclosure.

HUMBERT FROSSARD DE SAUGY.